(12) United States Patent
Kuper (10) Patent No.: US 11,000,777 B1
(45) Date of Patent: May 11, 2021

(54) APPARATUS AND PROCESS FOR TREATING WATER

(71) Applicant: Richard J. Kuper, Charleston, AR (US)

(72) Inventor: Richard J. Kuper, Charleston, AR (US)

( * ) Notice: Subject to any disclaimer, the term of this patent is extended or adjusted under 35 U.S.C. 154(b) by 0 days.

(21) Appl. No.: 16/460,366

(22) Filed: Jul. 2, 2019

Related U.S. Application Data (60) Provisional application No. 62/693,792, filed on Jul. 3, 2018.

(51) Int. Cl.
| | | |
|---|---|---|
| *B01D 1/22* | (2006.01) | |
| *C02F 11/13* | (2019.01) | |
| *C02F 1/08* | (2006.01) | |
| *B01D 1/00* | (2006.01) | |
| *B01D 5/00* | (2006.01) | |
| *C02F 1/06* | (2006.01) | |

(52) U.S. Cl.
CPC ........... *B01D 1/225* (2013.01); *B01D 1/0064* (2013.01); *B01D 5/006* (2013.01); *C02F 1/06* (2013.01); *C02F 1/08* (2013.01); *C02F 11/13* (2019.01); *C02F 2303/26* (2013.01)

(58) Field of Classification Search
CPC ........ B01D 1/222; B01D 1/223; B01D 1/225; B01D 1/226; B01D 1/227; B01D 1/228; B01D 1/24; B01D 1/0064; B01D 5/006; F26B 5/041; F26B 11/12; F26B 11/14; F26B 11/16; F26B 3/36; C02F 11/12; C02F 11/13; C02F 1/06; C02F 1/08; C02F 2303/26; B02C 13/04
See application file for complete search history.

(56) References Cited

U.S. PATENT DOCUMENTS

| | | | |
|---|---|---|---|
| 1,735,396 A * | 11/1929 | Hiller | F26B 11/16 241/18 |
| 3,946,495 A | 3/1976 | Osdor | 34/15 |
| 3,997,406 A | 12/1976 | Arvanitakis | 202/175 |
| 4,188,195 A | 2/1980 | Jablin | 55/89 |
| 4,192,746 A | 3/1980 | Arvanitakis | 210/73 |
| 4,917,310 A | 4/1990 | Carrera | 241/32 |
| 5,104,047 A | 4/1992 | Simmons | 241/20 |
| 5,557,873 A | 9/1996 | Lynam et al. | 34/379 |
| 7,028,931 B2 * | 4/2006 | Lin | B02C 13/04 209/134 |

(Continued)

*Primary Examiner* — Jonathan Luke Pilcher
(74) *Attorney, Agent, or Firm* — Keisling & Pieper PLC; Trent C. Keisling; David B. Pieper (57) ABSTRACT

A system that uses thermal addition, particle size reduction, increasing surface area, pressure reduction and kinetic energy increases to vaporize and dewater wastewater and/or sludge and/or other liquids mixed with entrained solids to produce a cleaned water condensate and a dewatered solid product. The wastewater and/or sludge enters a cylindrical drum through a rotary entrance valve. A rotating hammermill inside a drum with an exterior thermal jacket pulverizes the entering wastewater or sludge with rotating blades that keep the pulverized product against the inside of the drum's inside surface to vaporize water to separate it from solids. The vaporized water is condensed and discharged from the system and a solid product exits the drum via rotary valves. A vacuum is maintained on the drum to enhance the system.

7 Claims, 3 Drawing Sheets

(56) References Cited

U.S. PATENT DOCUMENTS

| | | | |
|---|---|---|---|
| 7,240,868 B2 * | 7/2007 | Lin | B02C 13/04 |
| | | | 209/134 |
| 7,882,646 B2 | 2/2011 | Gorbell et al. | 34/514 |
| 9,327,997 B1 | 5/2016 | Kuper | |
| 2004/0144405 A1 * | 7/2004 | Garrick | F26B 11/16 |
| | | | 134/25.1 |
| 2005/0103909 A1 * | 5/2005 | Lin | B02C 13/04 |
| | | | 241/89.3 |
| 2006/0180685 A1 * | 8/2006 | Lin | B02C 13/10 |
| | | | 241/79.1 |

* cited by examiner

APPARATUS AND PROCESS FOR TREATING WATER

CROSS-REFERENCE TO RELATED APPLICATIONS

This application claims priority to and is a continuation-in-part of U.S. Provisional Application Ser. No. 62/693,792, filed on Jul. 3, 2018 by Richard J. Kuper entitled Apparatus and Process for Treating Water. This prior application is incorporated by reference in its entirety.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The invention pertains to improvements in water treatment processes and apparatus and particularly the arrangement of the apparatus and processing equipment associated therewith. Known art can be found in class 202 subclass 175 and in class 210, subclass 73 and in other classes and subclasses.

2. Description of the Known Art

Those skilled in the art will appreciate that it is often desirable to remove entrained solids from waste water and the like. Often, processing of wastewater is slowed by the removal of these entrained solids. The known art has provided a variety of proposals to meet this need and such proposals have been attempted, and they may have been acceptable for their intended purposes. One conventional proposal is to first treat the wastewater to remove most of the entrained solids, perhaps as much as 98% of the entrained solids. After the first step, the remaining water entrained solids are substantially more viscous, and it is commonly referred to as sludge. The sludge is often next placed in a lagoon so that the remaining solids settle to the bottom over an extended period of time. Water from the tops of these lagoons is normally drawn off as the solids settle until the lagoon fills. These lagoons are often outside and exposed to the weather and climate and can release malodorous fumes. The lagoons are often rained upon and can spill uncontrollably if flooded, which is undesirable.

In the fairly recent past, such lagoon systems have become less favored and it is now necessary to address the removal of these concentrated solids from the sludge instead of simply pumping the sludge into a lagoon and waiting until the solids settle out. Proposed solutions provided in the art have been limited in their application and have failed to address large quantities of entrained solids in large volumes of wastewater that must be processed in a relatively short period of time, such as is often encountered with animal processing facilities that process animals into consumable food products. Such facilities often generate wastewater containing large amounts of animal portions and especially fat. These entrained solids are difficult to substantially remove from the wastewater and especially sludge in a timely manner.

Food processing plants would also benefit from an improved system or treating water. Many contemporary food processing plants use large amounts of water to produce their products. As the water is used, it becomes heavily polluted with solids. This water must be cleaned to a level acceptable by the water supplier that supplies water to the plant when it is returned to the supplier. If the used water is not cleaned sufficiently, the processor is charged a surcharge or a fine. As the water is cleaned by the processing plant, a large amount of sludge is produced. This sludge is produced by a diffuse air filtration system (DAF system) in the water treatment portion of the plant. This sludge is often removed from the DAF system mechanically and is often referred to as DAF skimmings.

The DAF skimmings (i.e. sludge) so produced must then be disposed of. The most common disposal method is hauling it away and applying it to agricultural or farm land. This application is usually by subsoil injection. Both the transport and application are very costly. The cost can be affected by the amount of sludge produced by a plant as well as how far the plant is located from the disposal area (i.e. the farm). Sometimes the sludge to be land applied is classified as raw sewage, which can increase costs for transportation and application and environmental concerns as well.

Another problem that is often encountered is caused by weather delays (i.e. rain, ice, snow, etc.) that delay or otherwise inhibit land application of the sludge. For example, if the land becomes saturated with rainfall some of the sludge can seep to the top of the soil and cause odor problems or other issues. Therefore, reducing the quantity of sludge created by the food processing plant is desirable.

In addition to dewatering sludge from food processing plants, the water treatment process and apparatus can be used for dewatering whey, wet distiller's grain, or any other product that has a high water content to low solids content.

Also, the resultant products of dewatered sludge can be valuable. Further the transportation cost can be reduced if the water content of the sludge is reduced. The dewatered sludge can be a concentrated protein produce that can be used in animal feed rations. The same is true when the process is used in ethanol production plants. The transport costs of wet distiller's grain is reduced and the shelf life of the product is extending and the DDG has more value. Any has water content product that has to be dewatered would benefit from this invention.

Another growing user of water has become the petroleum industry and the use of large amounts of water in fracturing (i.e. fracking) during oil production, which produces large amounts of contaminated water. The fracking process involves the high-pressure injection of 'fracking fluid' (primarily water, containing sand or other proppants suspended with the aid of thickening agents) into a wellbore to create cracks in the deep-rock formations through which natural gas, petroleum, and brine will flow more freely. The resultant waste waters flowing back to the surface has to be treated to remove contaminants therefrom. The wastewater is generally in large quantities and transportation costs can be significant to move the wastewater to a treatment facility.

Most previously proposed solutions for such problems have not provided processes and devices adept at handling large quantities of solids entrained in large volumes of water and those that have attempted this are unduly slow and inefficient or otherwise unsatisfactory. Therefore, a need exists for an improved water treatment process and apparatus and one that can successfully address the perceived shortcomings of the known art is desirable.

Known art which may be relevant to the present invention includes the following patents with their abstracts, the teachings of which are incorporated by reference.

U.S. Pat. No. 9,327,997, issued to Kuper on May 3, 2016, entitled Water Treatment Process and Apparatus, is for a water treatment system for treating viscous sludge containing entrained solids in water by evaporating the water from the viscous sludge to produce water and dehydrated solids including a tank with an internal agitator with an associated rotary meter to dispense metered quantities of the sludge into a subsequent dehydrator for heating the sludge to evaporate the water therefrom to produce dehydrated solids exiting through a meter and a gas containing evaporated water going to a condenser connected to the dehydrator to receive gas therefrom for condensing it into a liquid that is discharged from the system and provide dehydrated gas to a subsequent vacuum pump that maintains a relatively static vacuum. While this system works well for its intended purposes, it has been difficult to service and maintain.

U.S. Pat. No. 4,917,310, issued to Carrera on Apr. 17, 1990, entitled Processing apparatus for solid refuse, is for a processing apparatus for solid waste including a rotor with a plurality of blades mounted thereon for shredding solid waste in corporation with a number of counterblades. A prescreening system is provided adjacent the inlet to the shredding elements so as to allow small abrasive items to be removed from the waste prior to shredding. A flexible cleaning system is provided for cleaning waste wrapped about the rotor between the blades. Further, a system is provided for preventing nonshreddable materials from jamming the rotor blade/counterblade system and for diverting such nonshreddable materials to a designated hopper. This apparatus is not used with sludge or wastewater.

U.S. Pat. No. 5,104,047, issued to Simmons on Apr. 14, 1992, entitled Wet process recovery system for solid waste, is for a wet process recovery system for solid waste. The waste is fed into a hydrokinetic separation step wherein it is immersed in a body of water which is subjected to rising and lateral flows. These flows establish a synthetic gravitational environment to effect separation of solids above and below a predetermined density greater than the density of water. The solids having the higher densities are collected by gravity and transported from the water for recycling. A modified hammermill is connected to the body of water and the rising and lateral fluid flows cooperate to carry waste into a cutting and ejecting mechanism which both shears friable waste and dynamically ejects non-friable waste back into the liquid. The output of the hammermill is a slurry of comminuted waste in the liquid. This is pumped to a centrifuge separator where solid waste is separated from liquid and the liquid recirculated to the body of water to create the flows in that body. The solid waste output is in a deliquified form suitable for use in a waste to energy incineration process. The process uses a centrifuge to separate the solid waste from the liquid and not water vaporization.

U.S. Pat. No. 5,557,873, issued to Lynam, et al., on Sep. 24, 1996, entitled Method of treating sludge containing fibrous material, is for a method of converting industrial, domestic or other sludge, into a pelletized or granular fertilizer, as well as a sludge converter for practicing the method. The sludge is dewatered to form sludge cake solids which are dried in a dryer, and then sorted with a sorter into a sorted product comprising oversized, undersized, and standard sized product. Oversized product containing fibrous material is reduced in size by grinding in a hammermill. A portion of the sorted product is recycled for mixing and sizing in a mixer with the dewatered sludge cake solids. To control dust and odors, cyclones and a condenser remove a substantial portion of the gaseous particulate matter and condensable gases from the converter, and any remaining noncondensates are burned in the heat source flame. A waste oil burning heat source supplies heat energy to the dryer. The heat source exhaust gas by-products are filtered in a bag house using a conditioner additive, such as lime or sodium bicarbonate, which may be reclaimed and supplied to the standard sized product to serve as a pelletizing binder, to enhance the fertilizer nutrient value, or to enhance the fertilizer shelf life. This process does not use a vaporizing hammermill to separate water from contaminants.

U.S. Pat. No. 3,997,406, issued to Arvanitakis on Dec. 14, 1976, entitled Evaporating Apparatus, is for a method of and apparatus for receiving low-volume liquid sludge concentrations, exposing the liquid-sludge slurry to a heating surface thereby evaporating a portion of the liquid from the slurry, and advancing the contaminant bearing liquid for further exposure to additional heating surfaces such that as the slurry passes therethrough, in thermal contact with the heating surfaces, the solids content is increased by evaporating the liquid material while allowing the solids material to accumulate on the heating surfaces which are automatically and continuously cleaned to maintain the efficiency of the system and discharge these materials in a substantially dry state. This reference is for low volumes of wastewater treatment.

U.S. Pat. No. 4,192,746, issued to Arvanitakis on Mar. 11, 1980 is entitled Liquid Clarification System. Its abstracts describes a liquid clarification system for separating solid and/or chemical contaminants from an unclarified liquid wherein a variable influent is passed through a settling clarifier to separate a portion of the contaminants from the liquid forming a semi-solid sludge. The sludge is passed into a reservoir and delivered to a filtration system at a controlled predetermined percentage of solids material. The solids material is circulated through the filtration system to form a filter cake on the septum of filters carried in a filtration chamber and the liquid is clarified by passing through the filter cake formed thereon. Periodically when the filter cake must be reformed, the expended cake is removed from the septum and conveyed from the filtration chamber through a sludge drying system to be discharged as dry solids waste material. This reference uses a filter to remove entrained solids, which requires filter removal and cleaning.

U.S. Pat. No. 4,188,195, issued to Jablin on Feb. 12, 1980 is entitled Treatment of Waste Liquor. Its abstract describes a waste liquor treatment system comprising an evaporator in combination with a gas cooler, the evaporator providing fractional distillation of waste liquor, thereby separating the liquor into its several components of gaseous vapors, purified water and concentrated brine. Condensed liquor from the gas cooler or flushing liquor used to spray an industrial process gas in the collecting mains of the gas-producing plant provides thermal energy from its waste heat to run the evaporator. The evaporator consists of a boiler section, a condenser section, a vacuum pump, a liquor circulating pump, and nozzles for extracting the products. The gas cooler may be one or two stage. In the one stage cooler, the hot liquor which condenses in the gas cooling process or flushing liquor from the collecting mains of the gas-producing plant provides energy for the evaporator through means of a heat exchanger. In the two stage gas cooler, the hot liquor in the first stage is circulated directly to the boiler section of the evaporator. The hot liquor from the second stage is circulated through a separate heat exchanger. This reference does not handle entrained solids.

U.S. Pat. No. 3,946,495, issued to Osdor on Mar. 30, 1976 is entitled Method and Apparatus for Drying Moisture-Containing Solids Particularly Domestic Refuse and Sludge Cakes. This patent describes a method and apparatus for the production of solid fuel and steam by drying moisture-containing solids, such as refuse and sludge cakes, in a multi-stage heating zone by using the moisture-containing solids as the feed-water in a direct contact countercurrent flow pressurized boiler. After vaporizing the bulk of the moisture in the heating zone of the boiler, the solid residue is further dried in a multi-stage flashing zone. From the upper end of the heating zone is removed a nearly saturated steam including the water vapor evaporated from the moisture-contained solids by the heat of cooling of the introduced superheated steam. A portion of the removed steam equal to the vaporized moisture is heated and then directed to a turbine, generating all the power required to operate the system. The bulk of the removed steam equal to the introduced superheated steam is compressed, reheated and recycled through the heating zone. The dried solid is removed at the lower end of the flashing zone and is incinerated, and the recovered heat is utilized to supply the heat required for said drying, and to produce saturated steam for heating purposes, or superheated steam for power generation. In the latter case the heat of condensation of the turbine exhaust steam is utilized advantageously as a heat source in a distillation plant for fresh water production. This reference is directed to the burning of the solids, which are in some instances valuable commodities that can be advantageously used for other purposes if collected instead of incinerated.

U.S. Pat. No. 7,882,646, issued to Gorbell et al. on Feb. 8, 2011 is entitled Process and System for Drying and Heat Treating Materials. This patent describes systems and methods for conversion of high moisture waste materials to dry or low moisture products for recycle or reuse. The equipment systems comprise a gas turbine generator unit (preferred heat source), a dryer vessel and a processing unit, wherein the connection between the gas turbine and the dryer vessel directs substantially all the gas turbine exhaust into the dryer vessel and substantially precludes the introduction of air into the dryer vessel and wherein the processing unit forms the dried material from the dryer vessel into granules, pellets or other desired form for the final product. Optionally, the systems and methods further provide for processing ventilation air from manufacturing facilities to reduce emissions therefrom. This reference and several of the preceding references fail to contain potential offensive odors.

Other attempts involving filters to spin the sludge to separate water from the solids are difficult to clean and maintain or to use with high volumes of sludge. Other attempts at dehydrating the sludge have required too much energy to heat the sludge to evaporate the water or too much time to evaporate the water for use with high volumes of sludge.

Also, commercially available equipment and components may be relevant, including commercial and municipal sewage treatment systems and processes and accompanying equipment and the like. Such equipment may be used in implementing an exemplary embodiment in accordance with the present invention.

None of these references, either singly or in combination, disclose or suggest the present invention. It is desirable to have an improved water treatment process and apparatus to address the perceived shortcomings of the known art. It is desirable to produce a usable dried and separated solid product removed from the wastewater. It is desirable to substantially contain offensive odors within the treatment apparatus. It is desirable to process large quantities of wastewater to remove entrained solids therefrom in a timely manner, generally in the range of five to ten gallons of wastewater per minute.

While it is evident from past attempts that solids removal from waste water is desirable, the known art is limited in its teaching and utilization, and an improved system is needed to overcome these limitations. An improved water treatment process and accompanying apparatus should provide a simple and efficient system for meeting the various needs of field personnel. The system should enable the user to work efficiently in the field or at other remote locales as desired. The system should be adaptable to retrofit to existing locales such as animal husbandry facilities, animal processing facilities, waste processing facilities, municipal sewage facilities and the like.

SUMMARY OF THE INVENTION

The present invention addresses the perceived needs in the known art discussed above. In this regard, the present invention substantially fulfills this need. The present invention provides an improved water treatment process and apparatus that produces a usable dried and separated solid product removed from the wastewater such as sludge or a wastewater containing suspended solids or dissolved solids. The present invention also substantially contains offensive odors within the treatment apparatus and it processes relatively large quantities of wastewater or sludge to remove entrained solids therefrom in a timely manner. The invention also requires a relatively small footprint compared to the amount of dewatering it is capable of performing.

This process converts the liquid water in the sludge to water vapor. The vapor is removed and the solids are left behind. The water vapor that was removed is condensed and is turned back to liquid. This liquid is then drained into the sewer at the plant and very little odor is released into the atmosphere. Several of the elements necessary to change phases of the water from liquid to vapor are used in this process. The sludge is pulverized into small particles and presented in a thin layer to be heated to address the latent heat of vaporization required to vaporize the water. The partial pressure of the water that is in the sludge is reduced. The surface area of the water in the sludge is increased. The particle size is reduced. Unless the particle size is reduced; on the outside of the particle will be most affected by the process of changing from liquid to vapor. The sludge is heated by two methods: A thermal fluid blanket is used on the outside of the unit to introduce energy or heat into the sludge from an outside source. This is either steam or thermal fluid or could include other heat sources (such as waste heat from internal combustion engines or the like). Energy is also produced in the sludge from inside the product. This is accomplished by producing kinetic energy inside the sludge. At least one important aspect of introducing energy into the sludge because as soon as the energy is produced, it can be used to vaporize the water in the sludge without passing through the wall of a vessel.

In one exemplary embodiment, the system is a hybrid design which uses both kinetic energy production and thermal heat or steam from the outside. The partial pressure is reduced by pulling a very deep vacuum on the product within the system itself. This deep vacuum is also important because the product vaporizes at a much lower temperature with a deep vacuum and thus the temperature differential between the sludge that is inside the unit and the thermal fluid that is on the outside of the system is greater. The greater the temperature differential is the more energy can pass through the wall of the system and into the sludge. Energy only flows from a higher source to a lower source. The surface area of the sludge and water inside the system is increased by the action of the rotating assembly inside the unit that pulverizes the sludge to present it for heating in a thin layer against the drum. This rotating assembly also insures that the product is always in contact with the heated area of the unit, in a very thin layer. If it were not always in contact with the heated area in a very thin layer, the energy transfer into the product would be hampered.

In one exemplary embodiment in accordance with the present invention the process involves using a heated apparatus with an internal vacuum to remove entrained solids from wastewater, whether those solids are suspended or dissolved or otherwise present. This process is a tail process that may be advantageously employed with a conventional upstream waste removal facility that separates most of the solids from the wastewater. Such a conventional treatment facility results in a wastewater substantially free from entrained solids and a thicker, more viscous wastewater, often referred to as sludge, which has a much higher concentration of solids to wastewater and generally oils and greases as well. The present invention is most particularly directed toward the treatment of such sludge to remove the entrained solids and retrieve the oils and greases from the remaining wastewater. The present invention may also be advantageously deployed at fracking sites to treat contaminated waste waters as well even if they have little or no entrained solids. Normally sufficient water is present for cooling at fracking sites but electrical power may be problematic but natural gas is usually abundant and so internal combustion generators or the like can be employed at such sites (and the waste heat from such motors can be used for at least a portion of the thermal requirements of the heater).

The present invention accepts wastewater and then converts substantially all of the water in the wastewater into water vapor. The water vapor is removed while contaminants are left behind. The removed water vapor is then condensed back into a liquid that may be drained directly into the sewer at the production site while releasing very little odors into the atmosphere.

The process uses a heater with an internal mill to heat the entering contaminated water in one exemplary embodiment. The heat exchanger evaporates the water under a vacuum to produce a dehydrated solid and vapors. This vacuum lowers the vaporization temperature so the product being dehydrated does not have to be heated to as high a temperature and serves to move the vapors out of the heat exchanger and into the subsequent unit for vapor condensation (i.e. either the preheater and condenser or the combined preheater/condenser). Furthermore, by keeping a substantially static vacuum in the heat exchanger, odors are contained within the heat exchanger and do not freely escape since vapors are not released to atmosphere in this process. The vapors that are produced during the evaporation process move to a condenser where the vapors are condensed back into water before passing them to an off-site treatment facility for further processing such as the previously mentioned municipal treatment facility. The vapors produced from water in the process are thus condensed back to water in the process but without the removed contaminants (i.e. solids or other contaminants).

When used with an animal processing facility producing solids containing fat and oil and grease entrained in the wastewater, the process takes substantially all of the oil and grease out of the sludge being dehydrated. This is important because dehydrated sludge can be used as a fuel source or be considered as a valuable byproduct as well as the decanted oils and grease. The process may be particularly advantageously employed to dehydrate the sludge produced from facilities producing sludge high in oil and/or grease and/or animal fats or the like.

The rotary meter passes a desirable quantity of sludge into the heat exchanger.

The entry and exit rotary meters work like revolving doors and restrict material entry into the system, and they may be adjusted to control volume throughput of the system. A vacuum is preferably maintained by the constant removal of any small amounts of gasses entering the system (e.g. air leaks, entrained air in the sludge, decompositional gasses from the sludge, etc.). While the vacuum does not have to be complete, it should be lower than atmospheric pressure to prevent the escape of odorous gasses from the system. Extensive testing has determined that a relatively substantial vacuum lowers the vapor pressure and boiling points of water desirably and so maintenance of a relatively high vacuum is preferred.

The condenser receives the evaporated water from the heat exchangers to condense the evaporated water into a liquid for discharge from the system and through which any remaining vacuum gasses may be captured for transmission to an offsite treatment facility.

Vacuum isolation piping prevents water from directly exiting the heater and entering the condensation tank and ensures that the vapors enter the condenser for condensation therein. A vacuum pump at the end of the line and adjacent the condensation tank maintains the system vacuum.

In addition to providing the features and advantages referred to above, it is an object of the present invention to provide improved water treatment process and apparatus that thoroughly removes entrained contaminants and solids from wastewater.

It is another object of the present invention to provide a produce a usable dried and separated solid product removed from the wastewater.

It is still another object of the present invention to substantially contain offensive odors within the treatment apparatus.

It is a further object of the present invention to process large quantities of wastewater to remove entrained solids therefrom in a timely manner.

It is an object of the present invention to provide a station that may be easily retrofitted and adapted to existing locales such as animal husbandry sites, animal processing facilities, municipal wastewater treatment sites, fracking sites and the like.

It is a further object of the present invention to provide a system that may be easily maintained.

It is a still further object of the present invention to provide a system that is quickly and easily deployable by a user.

These and other objects and advantages of the present invention, along with features of novelty appurtenant thereto, will appear or become apparent by reviewing the following detailed description of the invention in conjunction with the appended drawings.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

With reference now to the drawings FIGS. 1-6, one exemplary embodiment in accordance with the present invention is shown.

The system generally includes the following:

1. A drum or cylinder for the main vessel that is used to convert the water in the sludge to vapor.

2. A high speed rotating assembly centered within the drum.

3. Blades that are attached to the rotating assembly. These blades impact the sludge and pulverize it and perform several functions. These blades produce kinetic energy when they impact the sludge. The kinetic energy produced is ½ the mass times the velocity squared. Therefore each time the velocity is doubled, the energy produced is quadrupled. These blades reduce the particle size of the sludge (i.e. pulverizing it) and increase the surface area of the sludge in its pulverized state. These blades also propel the sludge and the dewatered product (i.e. pulverized sludge) toward the inner wall of the inside of the drum. Almost all of the vaporization of the water in the product/sludge takes place at the intersection of the outer end of the blades and the inside of the heated drum. This distance is a very short distance and the product/sludge is kept in a thin layer against the inside of the heated drum. If the sludge attempts to build up on the inside, the blades impact it and this prevents the buildup. Any buildup could inhibit energy from being transferred into the sludge through the wall of the drum. The blades are so aligned and spaced as to allow the water vapor to move through them toward the ends of the cylinder so that it can exit through the vapor lines to the condenser while at the same time limiting the entry of the product sludge inside the blades. The solids are kept against the inside of the drum by the pressure and centrifugal force of the rotating member and blades.

4. The rotating assembly is sealed between the shaft and the drum so that a deep vacuum can be maintained.

5. A rotary feed valve to allow product to be introduced into the sealed system while maintaining a deep vacuum. This is typically located at the centerline of the drum but can be located at the outer end of the drum if it is a smaller system. If the inlet rotary valve is located at the centerline of the drum, two rotary valves are used as exit valves (one at each drum end) at the bottom of the drum. If only one rotary inlet or feed valve is used on one drum end, then one exit rotary valve can be used on the opposite end at the drum bottom (when the valves are of the same approximate volume).

6. One or more rotary valves are used that allow the dewatered product to be removed from the sealed process while it is under a deep vacuum. As the liquid water changes phases from liquid to vapor, it expands 1600 times in volume at the same pressure. However, since the system is operated under a deep vacuum, the vapor expands around 12,000 times in volume at the same pressure. This vapor (that is removed from the sludge through the vapor removal lines that are located on the ends of the drum) is the motive force that moves dewatered sludge from the centerline of the drum toward the outside where it exits the system through the rotary valves.

7. Vapor lines that transport the water vapor to a condenser.

8. A condenser. This condenser can be either a shell and tube condenser or an atmospheric condenser. The preferred condenser for this process is the shell and tube condenser if there is ample water for cooling. This system was primarily developed for plants that use a large amount of water. This water, after it has been cleaned in the DAF system is used for the condensing. The condenser is a counter flow design that sues cooling water which has a turbulent flow instead of laminar flow.

9. A vacuum pump capable of pulling a deep vacuum on the entire system.

10. A thermal heat unit or a steam boiler for heat in the heat jacket surrounding the drum. The thermal fluid or steam is also turbulent flow inside this heating jacket. Because this system is operated under a deep vacuum, the water changes phases at a much lower temperature. This is an important feature of this process as it allows for a greater temperature differential between the product inside the drum and the thermal fluid/steam. This can translate into a much higher production rate than if the product inside the drum was a higher temperature.

11. A system for collecting condensate from the condenser. This system uses two tanks. One tank is under vacuum while the second tank is not under vacuum. The first tank is under vacuum and accepts the condensate until it reaches capacity and the condensate is then directed to the second tank and the vacuum is switched to the second tank as well. Thus, only one tank is under vacuum at a time. The tank not under vacuum is drained and then can be used to collect condensate again. The valves that discharge the condensate as well as open vacuum to the other tank are operated simultaneously so that vacuum is always present in the entire process. The only part of the process that does not have a deep vacuum on it is the tank that is discharging.

The system generally operates in steady state. The thermal fluid or heat is established at a level that is preset and maintained during operation. Next the rotating assembly is started rotating. Then a vacuum is established. Cooling water is pumped through the condenser and maintained at a constant flow through the shell and tube condenser during system operation. The vacuum inside the entire process is established and maintained as well. Then sludge (or other wastewater) is introduced through a rotary valve located at the centerline of the drum. This sludge is introduced while the internal rotating assembly is turning at a high rate of speed. The rotating assembly propels the sludge toward the outside of the drum to keep it in contact with the heated surface of the drum while maximizing surface area. This is one important aspect of this process. Unlike heating a product inside a vessel because the heat is only applied to the outside while the rest of the product is heated by radiation. The blades on the rotating assembly produce a very fine mist (within the product) as well as keeping the product in contact with the heated area of the drum. The blades on the rotating assembly also produce kinetic energy by impacting the sludge. The kinetic energy produced is equal to ½ the mass times the velocity squared. The blades in this process are moving at a very high speed. So every time the velocity is doubled, the energy produced is quadrupled. Since the process uses both kinetic energy and thermal energy from an outside source, it is a hybrid process.

As the water in the sludge/water product vaporizes, it travels through the vapor removal piping (which may be inclined upwardly at the drum so any inadvertent sludge/water drops are returned to the drum) to the condenser. In the condenser, the water vapor is returned back to its original state of liquid. The liquid water is then drained into a condensate removal system that empties into the sewer. Since the water is drained into the sewer, there is very little odor. The solids that were in the sludge when it was introduced are driven toward the outer edge of the rotating assembly and are propelled from the center of the system toward the ends by the action of the water vapor produced when the water is vaporized. As water changes phases under a deep vacuum (e.g. 26 vacuum inches), it increases in volume (at the same pressure) 12,000 times and this is the motive force to move the dewatered product toward the outer ends of the drum. The solids are emptied from the outer edge of the drum through one or more rotary valves. Thus, substantially all of the water vaporization happens at the blade ends and against the drum since the center of the rotating assembly is solid.

Several important considerations for this process and apparatus are:
1. It is a continuous operation.
2. It is easily managed.
3. The system reduces transport costs significantly.
4. The system reduces environmental concerns.
5. The system controls odor.
6. The system is substantially sealed.
7. The system uses a method to control the feed rate of input materials
8. The system provides a way to produce kinetic energy inside the sludge and also heats the sludge through a thermal jacket surrounding the drum.
9. The system provides a means to keep the product from building up on the heated surface inside of the drum.
10. The system provides a method to keep the product in contact with the heated drum surface.
11. The system provides a way to increase the surface area being heated.
12. The system provides a way to reduce particle sizes in the drum and it also presents a pulverized product to the heated drum surface in a thin layer.
13. The system provides a unique way to move the product through the system from entry to exit.
14. The system provides a way for the water vapor to exit through the hammers and into the condenser.
15. The system provides an excellent way to remove the condensate from the condensate tanks.
16. The system requires a relatively small space or footprint for installation.
17. The system may be implemented economically.
18. The system may be easily maintained.
19. The system uses thermal addition, particle size reduction, increasing surface area, pressure reduction and kinetic energy increases to vaporize and dewater wastewater and/or sludge to produce a cleaned water condensate and a dewatered solid product.

Figure 1:
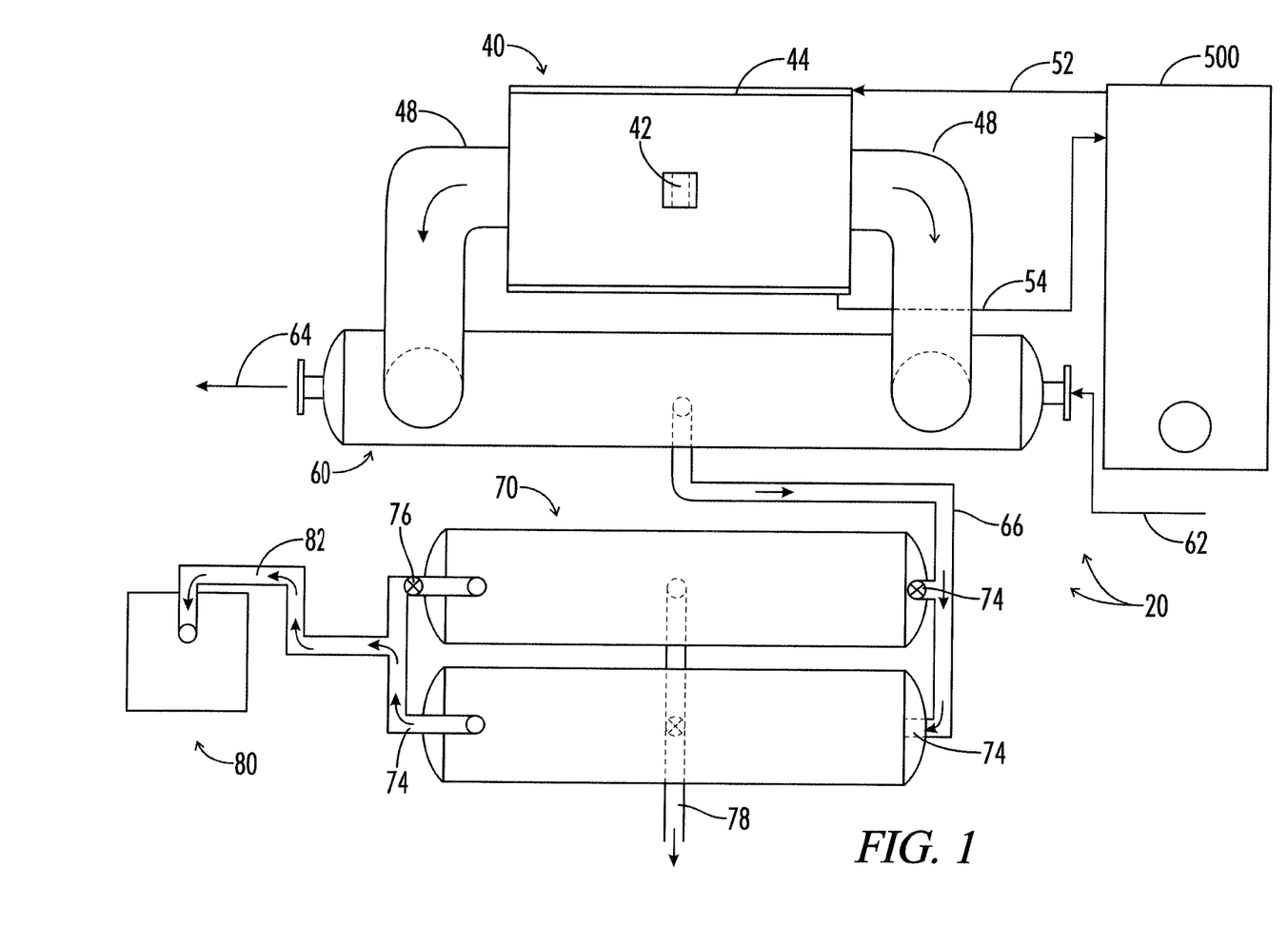
FIG. 1 is schematic diagram of the process in accordance with the present invention.

In FIG. 1, the system is generally indicated by reference numeral 20. A drum 40 receives entering product through a rotary valve 42. The drum 40 has a thermal jacket 44 that receives thermal fluid/steam to heat the outer drum wall 46. The drum 40 houses an internal rotating assembly with elongated blades (hammermill). The vaporized water leaves the drum through piping 48. Dewatered product leaves the drum through exit rotary valves 49. The dewatered product can include oils and greases or precipitated salts or other contaminants from the entering wastewater and/or sludge.

The drum jacket 44 receives thermal fluid or steam from a thermal fluid supply tank 50 via supply line 52. Spent thermal fluid is returned to the tank via return line 54.

The vaporized water enters the condenser 60 through piping 48. The condenser receives cooling water through line 62 and spent cooling water exits the condenser through line 64. Condensate leaves the condenser through exit line 66 and enters the condensate tanks 70.

Condensate tanks 70 include at least one tank 72 with vacuum valves 74, 76 and a discharge pipe 78. A vacuum line 82 secures the vacuum pump 80 to the tanks 70. Essentially all of the water is condensed out before the vacuum pump and so a relatively small vacuum pump can be used to address any leakage into the system.

Figure 2:
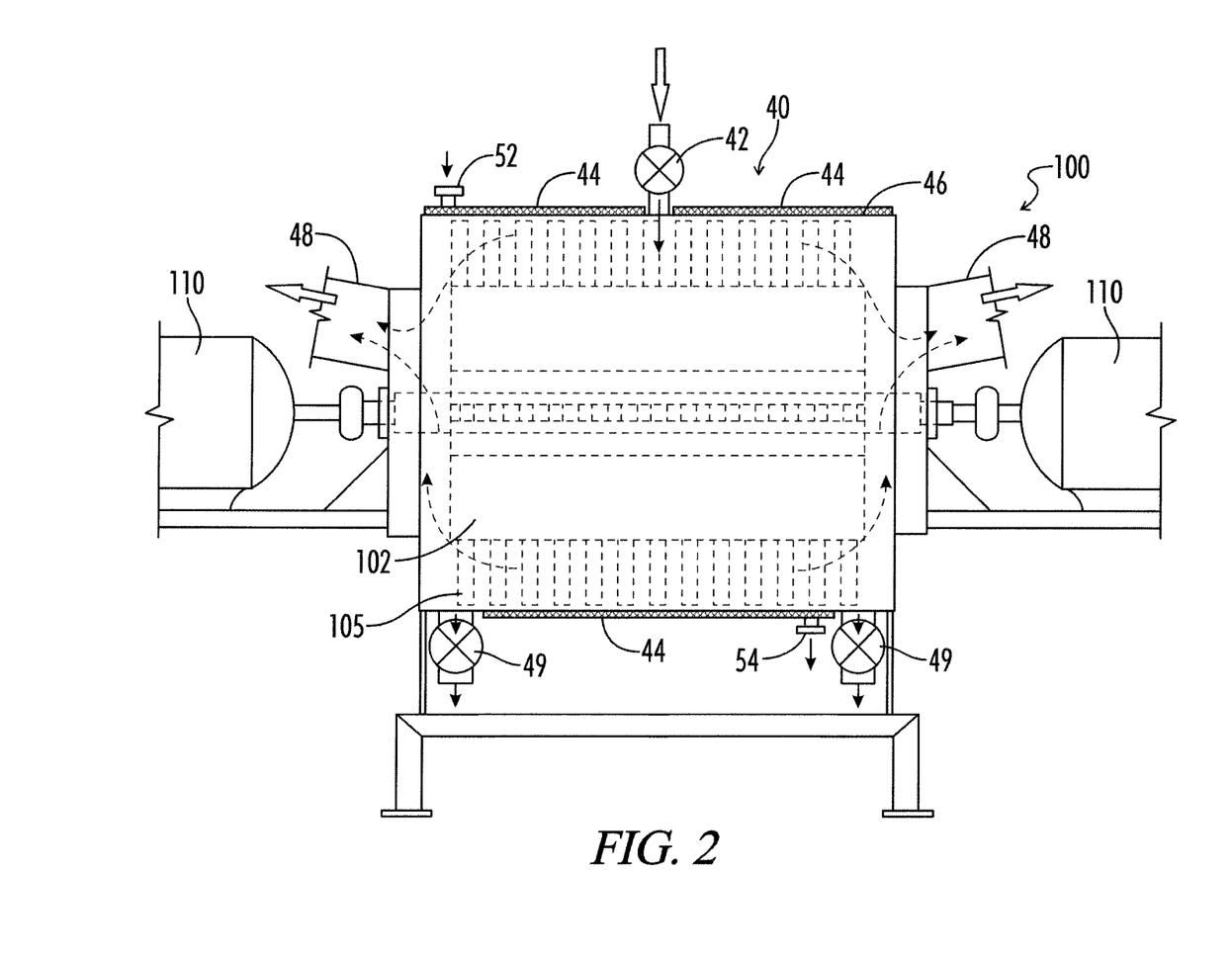
FIG. 2 is a side elevational view of the vaporizing hammermill with portions omitted or shown in section for clarity.

The drum 40 houses an internal rotating assembly 100. The rotating assembly 100 has a solid central core 102 extending through the drum 40 and driven at each end by electric motors 110. The central core is appropriately sealed with bearings and races to facilitate its rotary movement relative to the drum. The central core 102 supports multiple swingable hammers or blades 105 that pivotally extend outwardly from the core 102. These hammers (or blades) are essentially rigid when rotated at high speed even though they are each pivotally secured at the central core 102. When the core is rotated the blades 105 protrude toward the exterior drum wall 46 and travel relatively close to the wall with a clearance of less than a one inch and preferably closer and ideally less than a quarter of an inch. This close clearance presents the pulverized product in a thin layer against the hot inside surface of the drum, which enhances vaporization.

Figure 3:
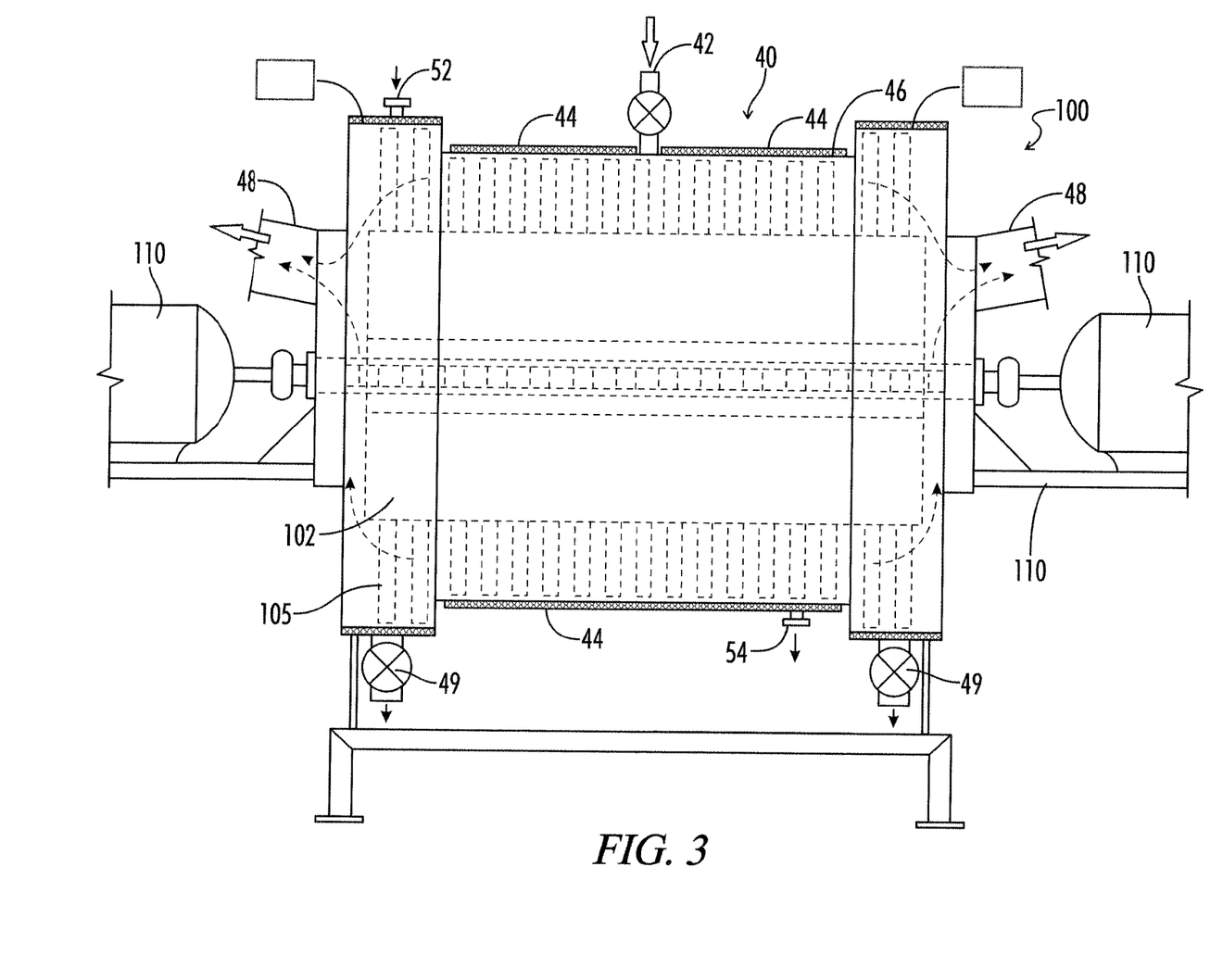
FIG. 3 is a side elevational view of another embodiment of the vaporizing hammermill with portions omitted or shown in section for clarity.

In a second embodiment shown in FIG. 3, the drum 40 is changed to accommodate higher production rates to prevent water vapor was taking solids with it on the way to the condenser. At lower rates this is not a problem but at substantially higher rates, sometimes the water vapor and solids can take the same pathway out of the drum. To address this issue, the drum diameter is increased at the ends by approximately 3 inches (i.e. last 10 inches of the drum at each end has a diameter of 54 inches) while the rest of the dimensions remain unchanged. The hammers at these end areas are also three inches longer. This larger diameter enables the solids to be propelled into these areas and then discharged through the rotary valves at the bottom. The water vapor continues to move out of the drum in same manner as before.

These larger areas are also heated by an external thermal jacket. This also insures that the solids are even more de watered as they are heated in this area without being in the presence of saturated water vapor.

The present invention provides several advantages including: 1. This increases the surface area of the product being vaporized; 2. This lowers the partial pressure of the product being vaporized; 3. This adds heat "energy" to the product being vaporized; 4. This process creates kinetic energy; 5. This keeps the product exposed to the heated surface in a thin layer; and, 6. This process is so designed that the velocity of the water vapor is the motive force used to move the product through the system.

The apparatus and process of the invention is capable of receiving additional, optional features which are not a part of the present invention. For example, a purchaser or user may specify an optional components or features that may be included to facilitate control and/or handling of the system during operation. Also, while examples have discussed wastewater and/or sludge it is to be appreciated that the present invention may be advantageously utilized with similar liquids containing solids (e.g. milk and the like). Other optional features, some of which may be illustrated herein, may or may not be included with apparatus incorporating the basic aspects of present invention. For example natural gas fueled engines, waste heat from internal combustion engines, etc. are options that could be utilized with the present invention.

In describing a preferred embodiment of the invention illustrated in the drawings, specific terminology has been used for the sake of clarity. However, the invention is not intended to be limited to the specific terms selected, and it is to be understood that each specific term includes all technical equivalents which operate in a similar manner to accomplish a similar purpose.

What is claimed is:

1. A water treatment apparatus for receiving water with solids therein to separate substantially all of the water from the solids, the apparatus comprising:
   an elongated cylindrical drum surrounded by a heated jacket and having spaced apart ends, a top, and a bottom, the drum adapted to receive the water with solids at the top and midway between the ends;
   a central core rotatably housed in the drum, the core supporting a plurality of elongated hammers pivotally extending outwardly therefrom, and where the central core is adapted to selectively rotate inside the drum to forcefully move the hammers proximate the inner surface of the drum to drive entering water with solids against the inner surface of the drum to produce water vapor thereby separating the water from the solids;
   an exit port at each end of the drum proximate the top and adapted to permit the water vapor to exit the drum for subsequent condensation back into water;
   a rotary valve at each end of the drum proximate the bottom and adapted to receive solids and dispense the solids from the drum; and,
   a vacuum pump proximate the drum communicatively coupled to the drum to maintain a vacuum inside the drum during operation.

2. The apparatus as defined in claim 1 further including a condenser proximate the drum communicatively coupled to the drum to receive the water vapor from the drum and to condense the water vapor.

3. The apparatus as defined in claim 1 wherein the drum has an enlarged portion with a diameter proximate at least one end that is larger than a middle portion of the drum to accommodate larger quantities of water with solids.

4. The apparatus as defined in claim 1 wherein the drum has an enlarged portion with a diameter proximate both ends that is larger than a middle portion of the drum to accommodate larger quantities of water with solids.

5. A water treatment apparatus for receiving water with solids therein to separate substantially all of the water from the solids, the apparatus comprising:
   an elongated cylindrical drum surrounded by a heated jacket and having spaced apart ends, a top, and a bottom, the drum adapted to receive the water with solids at the top and midway between the ends;
   a central core rotatably housed in the drum, the core supporting a plurality of elongated hammers pivotally extending outwardly therefrom, and where the central core is adapted to selectively rotate inside the drum to forcefully move the hammers proximate the inner surface of the drum to drive entering water with solids against the inner surface of the drum to produce a thin film that promotes water vapor formation thereby separating the water from the solids;
   an exit port at each end of the drum proximate the top and adapted to permit the water vapor to exit the drum for subsequent condensation back into water;
   a rotary valve at each end of the drum and proximate the bottom and adapted to receive solids and dispense the solids from the drum;
   a vacuum pump proximate the drum communicatively coupled to the drum to maintain a vacuum inside the drum during operation; and,
   a condenser proximate the drum communicatively coupled to the drum to receive the water vapor from the drum and to condense the water vapor.

6. The apparatus as defined in claim 5 wherein the drum has an enlarged portion with a diameter proximate at least one end that is larger than a middle portion of the drum to accommodate larger quantities of water with solids.

7. The apparatus as defined in claim 6 wherein the drum has an enlarged portion with a diameter proximate both ends that is larger than a middle portion of the drum to accommodate larger quantities of water with solids.

* * * * *